United States Patent
Murata et al.

(10) Patent No.: US 10,353,496 B2
(45) Date of Patent: Jul. 16, 2019

(54) TOUCH PANEL

(71) Applicant: PANASONIC INTELLECTUAL PROPERTY MANAGEMENT CO., LTD., Osaka (JP)

(72) Inventors: Keishiro Murata, Kyoto (JP); Shoji Fujii, Osaka (JP); Hiromitsu Niwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 95 days.

(21) Appl. No.: 15/549,353

(22) PCT Filed: Jan. 26, 2017

(86) PCT No.: PCT/JP2017/002635
§ 371 (c)(1),
(2) Date: Aug. 7, 2017

(87) PCT Pub. No.: WO2017/141655
PCT Pub. Date: Aug. 24, 2017

(65) Prior Publication Data
US 2018/0181225 A1    Jun. 28, 2018

(30) Foreign Application Priority Data
Feb. 18, 2016 (JP) ................. 2016-028467

(51) Int. Cl.
*G06F 3/041* (2006.01)
(52) U.S. Cl.
CPC ............ *G06F 3/041* (2013.01); *G06F 3/0418* (2013.01); *G06F 2203/04103* (2013.01); *G06F 2203/04107* (2013.01)

(58) Field of Classification Search
None
See application file for complete search history.

(56) References Cited

U.S. PATENT DOCUMENTS

| 4,755,898 A * | 7/1988 | Higashionji ......... G11B 5/1475 360/119.07 |
| 2005/0243245 A1* | 11/2005 | Taguchi ................. G02B 5/305 349/96 |
| 2018/0181225 A1* | 6/2018 | Murata ................... G06F 3/041 |

FOREIGN PATENT DOCUMENTS

| JP | 2005-284246 A | 10/2005 |
| JP | 2012-234467 A | 11/2012 |
| JP | 2013-203864 A | 10/2013 |
| JP | 2013203864 A | * 10/2013 |
| JP | 2014-067187 A | 4/2014 |
| JP | 2015-132691 A | 7/2015 |
| JP | 2015-212923 A | 11/2015 |

OTHER PUBLICATIONS

International Search Report and Written Opinion issued in International Patent Application No. PCT/JP2017/002635, dated Apr. 4, 2017.

* cited by examiner

*Primary Examiner* — Peter A Salamon
(74) *Attorney, Agent, or Firm* — McDermott Will & Emery LLP

(57) ABSTRACT

A touch panel includes a light-transmitting cover lens, a sensor portion, and a first adhesive layer. The first adhesive layer bonds the cover lens and the sensor portion to each other. The first adhesive layer has a storage elastic modulus at 90° C. of 68 kPa or more and 200 kPa or less. When a surface of the cover lens, being in contact with the first adhesive layer, is a bonding surface, a water contact angle on the bonding surface of the cover lens is more than 0° and 59° or less.

13 Claims, 3 Drawing Sheets rear surface ⟷ front surface

TOUCH PANEL

RELATED APPLICATIONS

This application is the U.S. National Phase under 35 U.S.C. § 371 of International Patent Application No. PCT/JP2017/002635, filed on Jan. 26, 2017, which in turn claims the benefit of Japanese Application No. 2016-028467, filed on Feb. 18, 2016, the entire disclosures of which applications are incorporated by reference herein.

TECHNICAL FIELD

The present disclosure relates to an electrostatic touch panel, and the like, left or used in environments of harsh temperature conditions.

BACKGROUND ART

Hereinafter, a conventional touch panel is described. A conventional touch panel includes a cover lens, a sensor portion, and a first adhesive layer. The cover lens and the sensor portion are disposed facing each other with the first adhesive layer therebetween. The first adhesive layer bonds the cover lens and the sensor portion to each other.

Note here that information on prior art literatures relating to this application include, for example, PTL 1 (for example, FIG. 2).

CITATION LIST

Patent Literature

PTL 1: Japanese Patent Application Unexamined Publication No. 2012-234467

SUMMARY OF THE INVENTION

A touch panel includes a light-transmitting cover lens, a sensor portion, and a first adhesive layer. The first adhesive layer bonds the cover lens and the sensor portion to each other. The first adhesive layer has a storage elastic modulus at 90° C. of 68 kPa or more and 200 kPa or less. When a surface of the cover lens, being in contact with the first adhesive layer, is a bonding surface, a water contact angle on the bonding surface of the cover lens is more than 0° and 59° or less.

DESCRIPTION OF EMBODIMENTS

Figure 1:
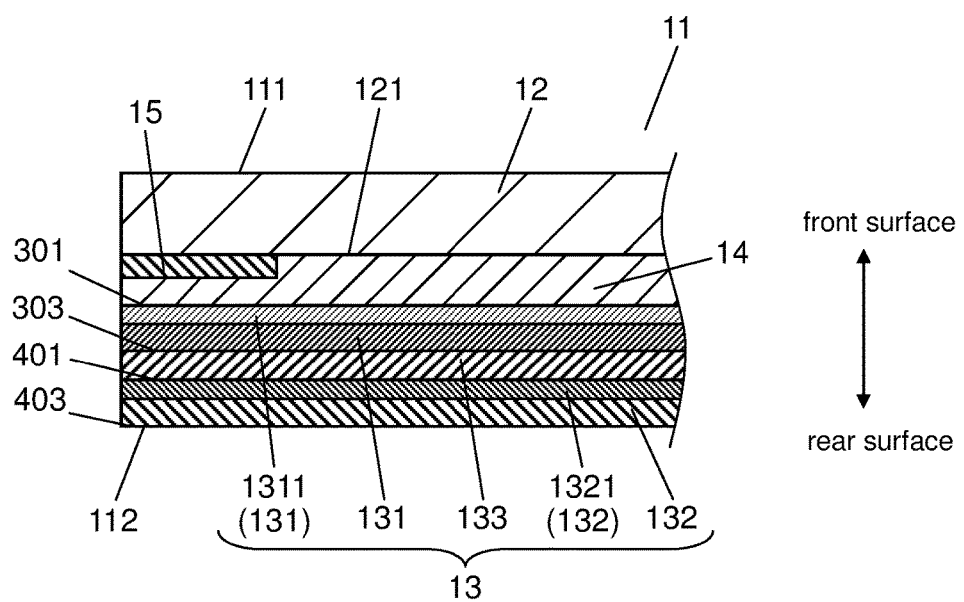
FIG. 1 is an enlarged sectional view of a principal part of a touch panel in accordance with a first exemplary embodiment.

When a conventional touch panel is left or used at high temperature or low temperature, air bubbles may occur in a first adhesive layer at an interface between a cover lens and the first adhesive layer. Furthermore, the first adhesive layer may be peeled off at the interface between the cover lens and the first adhesive layer. When air bubbles or peeling occurs, electrostatic capacity between electrodes formed on the touch panel changes, and sensitivity of a touch sensor may be decreased. Furthermore, a display on a display unit may not be able to be clearly displayed.

Hereinafter, exemplary embodiments of touch panels are described with reference to drawings. Since the same component elements with the same reference numerals given in the exemplary embodiments carry out the same operations, detailed description thereof may not be repeated.

Prior to the description of a touch panel of the present disclosure, an apparatus including an electronic device equipped with a touch panel as well as an environment in which the electronic device is placed and used are described.

In recent years, an electronic device including a touch panel has been installed in a mobile device such as an automobile. Such a mobile device may be used or left in very wide temperature-environments from, for example, an extremely cold area in the Arctic Circle to an extremely hot area such as an area directly on the equator or a desert. Examples of the electronic device include a car-navigation system, and the like. In this case, an electronic device is disposed on a dashboard. The dashboard is disposed immediately below a windshield. Consequently, the direct sunlight may hit the electronic device so as to increase a temperature of the electronic device. Therefore, a touch panel installed in such an electronic device is required to suppress deterioration of sensitivity or to have high reliability capable of continuing clear display even when the touch panel is left or used in environments of harsh temperature conditions.

Note here that the mobile device is not necessarily limited to an automobile, and may be a motorcycle, a ship, an aircraft, various agricultural apparatuses, architectural apparatuses, and the like. Furthermore, the electronic device is not necessarily limited to, a car-navigation system, and may be any devices including a touch panel.

First Exemplary Embodiment

Figure 2:
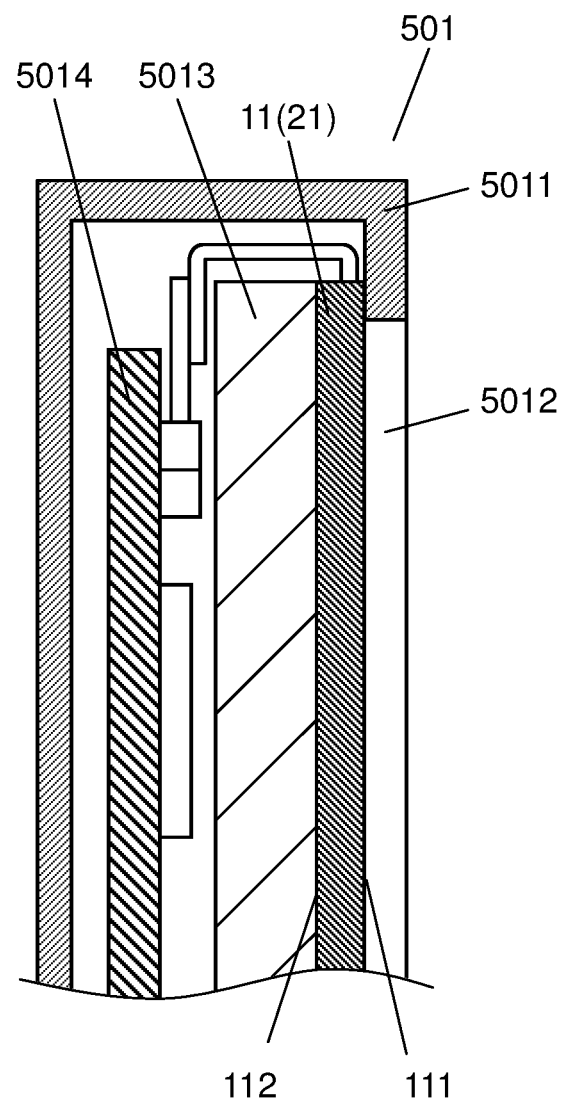
FIG. 2 is an enlarged sectional view of a principal part of an electronic device in accordance with the first exemplary embodiment.

FIG. 1 is an enlarged sectional view of a principal part of touch panel 11. FIG. 2 is an enlarged sectional view of a principal part of electronic device 501. Touch panel 11 includes light-transmitting cover lens 12, sensor portion 13, and first adhesive layer 14. First adhesive layer 14 bonds cover lens 12 and sensor portion 13 to each other. First adhesive layer 14 has a storage elastic modulus at 90° C. of 68 kPa or more and 200 kPa or less. When a surface of cover lens 12, being in contact with first adhesive layer 14, is bonding surface 121, a water contact angle on bonding surface 121 of cover lens 12 is more than 0° and 59° or less.

Hereinafter, electronic device 501 equipped with touch panel 11 is described in detail. Electronic device 501 includes touch panel 11, enclosure 5011, display unit 5013, and controller 5014 (see FIG. 2). Enclosure 5011 is provided with display hole 5012. Touch panel 11 has front-surface side 111 and rear-surface side 112 (see FIG. 1). Touch panel 11 is housed in enclosure 5011 with front-surface side 111 facing display hole 5012. Display unit 5013 is disposed on rear-surface side 112 of touch panel 11. Note here that a light-emitting surface of display unit 5013 is disposed facing rear-surface side 112.

Controller 5014 is electrically connected to touch panel 11. With this configuration, controller 5014 detects an input to touch panel 11 by an operator. Furthermore, controller 5014 is electrically connected to display unit 5013. Therefore, controller 5014 can display a desired display on display unit 5013. These configurations allow the operator to visually identify the display on display unit 5013, which has passed through touch panel 11.

Hereinafter, touch panel 11 is described with reference to FIG. 1. Touch panel 11 includes cover lens 12, sensor portion 13, and first adhesive layer 14. Cover lens 12 has bonding surface 121. Touch panel 11 includes front-surface side 111 and rear-surface side 112. Front-surface side 111 is an opposite side to bonding surface 121 of cover lens 12. Furthermore, rear-surface side 112 is an opposite side to first adhesive layer 14 of sensor portion 13. Cover lens 12 is formed of a light-transmitting resin or glass. Sensor portion 13 is disposed facing cover lens 12. First adhesive layer 14 is disposed between sensor portion 13 and bonding surface 121, and bonds sensor portion 13 and cover lens 12 to each other. That is to say, cover lens 12 is in contact with first adhesive layer 14 on bonding surface 121. In the above-mentioned configuration, first adhesive layer 14 has a storage elastic modulus at 90° C. of 68 kPa or more and 200 kPa or less. Furthermore, the water contact angle on bonding surface 121 is more than 0° and 59° or less.

As mentioned above, because the storage elastic modulus of first adhesive layer 14 at 90° C. is 68 kPa or more, a flow of first adhesive layer 14 can be suppressed. Note here that the storage elastic modulus of first adhesive layer 14 is more preferably 80 kPa or more. This configuration can further suppress the flow of first adhesive layer 14. Consequently, this suppresses growth of bubbles of gas occurring from members such as cover lens 12 and accumulated in first adhesive layer 14.

Furthermore, in order to compensate for decrease of adhesion of first adhesive layer 14 to cover lens 12 due to the increase in the storage elastic modulus of first adhesive layer 14, it is preferable that the water contact angle on bonding surface 121 of cover lens 12 is more than 0° and 59° or less. Note here that it is more preferable that the water contact angle on bonding surface 121 is 53° or less. Since this configuration improves wettability of first adhesive layer 14 with respect to bonding surface 121, first adhesive layer 14 easily wets and spreads to bonding surface 121. Therefore, it is possible to suppress occurrence of air bubbles occurring around a contaminant as a core in bonding surface 121. As a result, suppression of occurrence and suppression of growth of air bubbles can be both achieved.

Furthermore, since the storage elastic modulus of first adhesive layer 14 is 200 kPa or less, the adhesion of first adhesive layer 14 to cover lens 12 can be prevented from being remarkably decreased. Therefore, the adhesion of first adhesive layer 14 to cover lens 12 is improved even at low temperature, and occurrence of peeling of first adhesive layer 14 at an interface between cover lens 12 and first adhesive layer 14 can be suppressed. Furthermore, since the contact angle is larger than 0°, spreading of first adhesive layer 14 toward the side surface of cover lens 12 can be suppressed.

Furthermore, since the storage elastic modulus of first adhesive layer 14 at 90° C. is specified, even when touch panel 11 is left or used under high temperature, it is possible to suppress the occurrence of air bubbles on first adhesive layer 14 at the interface with respect to cover lens 12.

The above-mentioned configuration makes it possible to suppress occurrence of air bubbles or peeling on first adhesive layer 14 at the interface with cover lens 12 even when touch panel 11 is left or used at high temperature or low temperature. Therefore, even under harsh temperature conditions, it is possible to obtain touch panel 11 having high reliability, being capable of suppressing deterioration of sensitivity and continuing clear displaying.

Hereinafter, specific configurations of touch panel 11 are described. Cover lens 12 is formed of a light-transmitting resin material or glass. When cover lens 12 is formed of resin, for example, polymethyl methacrylate (hereinafter, referred to as "PMMA"), polycarbonate (hereinafter, referred to as "PC") resin, or the like, is preferably used for cover lens 12. Sensor portion 13 is formed of a light-transmitting resin material, for example, polycarbonate (PC), polyether sulfone (PES), polyethylene terephthalate (PET), or the like. Sensor portion 13 is formed of a film having flexibility. For first adhesive layer 14, it is preferable to use, for example, optically clear adhesive (hereinafter, referred to as "OCA") containing an acrylic polymer, a silicone polymer, a urethane polymer, a rubber polymer, an epoxy polymer, or the like, or mixtures thereof are used as a main material.

Note here that cover lens 12, sensor portion 13, and first adhesive layer 14 have transmitting property with respect to light having a wavelength of visible light. The wavelength of visible light is generally from 380 nm to 780 nm. Cover lens 12 and sensor portion 13 have transmittance of 85% or more with respect to the entire visible light. First adhesive layer 14 has transmittance of 95% or more with respect to the entire visible light. This transmittance is calculated by dividing the transmittance of first adhesive layer 14, which is measured in a state in which first adhesive layer 14 is attached to a substrate such as a glass, by the transmittance of the substrate. Note here that values of transmittance are measured in accordance with JIS K7136. The values of the transmittance can be measured using, for example, HM-150 (manufactured by Murakami Color Research Laboratory).

Furthermore, a value of the storage elastic modulus of first adhesive layer 14 can be measured in accordance with JIS K7244. The value of the storage elastic modulus can be measured using, for example, DMA7100 manufactured by Hitachi High-Tech Science Corporation. The value of the storage elastic modulus of first adhesive layer 14 is expressed as a value measured at 90° C. The value of the storage elastic modulus of first adhesive layer 14 changes in response to temperatures. In general, the values decreases with increase in temperature. Thus, it is preferable that the storage elastic modulus of touch panel 11 used in such a high temperature environment is set at 90° C. Hereinafter, a storage elastic modulus, when simply referred to as storage elastic modulus, represents a value at 90° C. Note here that the storage elastic modulus is defined at 90° C., but the storage elastic modulus is not necessarily limited thereto, and may be values at any temperatures depending on an environment in which touch panel 11 is used.

A contact angle of cover lens 12 is determined by the cleanliness of a surface of cover lens 12. The contact angle of cover lens 12 can be adjusted by modification of the surface of cover lens 12 by UV ozone treatment or plasma etching treatment. The contact angle of cover lens 12 is measured in accordance with JIS R 3257. The contact angle of cover lens 12 is a water contact angle. The values of the contact angle can be measured by, for example, DM-901 manufactured by Kyowa Interface Science Co., Ltd.

Herein, a range of wettability of cover lens 12 is defined by the contact angle. However, instead of the contact angle, the wettability range may be defined by values converted into surface tension. In such a case, as the conversion formula, already-known mathematical formulae used for calculating the surface tension can be used. For example, when the contact angle of cover lens 12 is 88°, the surface tension on the surface of cover lens 12 corresponds to 26 mN/m. Furthermore, when the contact angle of cover lens 12 is 59°, the surface tension of the surface of cover lens 12 corresponds to 30 mN/m. In addition, when the contact angle is 53°, the surface tension corresponds to 43 mN/m. When the contact angle is 40°, the surface tension corresponds to 56 mN/m.

The present inventors have produced samples 1 to 10 shown in Table 1, in order to assess material property of cover lens 12, a contact angle and a range of the storage elastic modulus of first adhesive layer 14, and occurrence of air bubbles or peeling. The contact angles of cover lenses 12 in samples 3, 4, and 5 and samples 7, 8, and 9 are adjusted by surface modification treatment. In other words, cover lenses 12 in samples 1, 2, 6 and 10 are not subjected to the surface modification treatment.

TABLE 1

| | Contact angle (°) | Surface modification treatment | Storage elastic modulus (kPa) | Material of cover lens | Occurrence of air bubbles or peeling after 72 h | Occurrence of air bubbles or peeling after 120 h |
|---|---|---|---|---|---|---|
| S1 | 88 | Not carried out | 68 | PC | X | X |
| S2 | 88 | Not carried out | 80 | PC | ○ | Δ |
| S3 | 59 | Carried out | 68 | PC | ○ | Δ |
| S4 | 53 | Carried out | 68 | PC | ○ | ○ |
| S5 | 40 | Carried out | 68 | PC | ○ | ○ |
| S6 | 40 | Not carried out | 68 | Glass | ○ | ○ |
| S7 | 59 | Carried out | 80 | PC | ○ | ○ |
| S8 | 53 | Carried out | 80 | PC | ○ | ○ |
| S9 | 40 | Carried out | 80 | PC | ○ | ○ |
| S10 | 40 | Not carried out | 80 | Glass | ○ | ○ |

*S . . . = Sample . . .

After samples 1 to 10 are allowed to stand under environment at 95° C. for 500 hours, occurrences of air bubbles or peeling are evaluated after the samples are allowed to stand for further 72 hours and 120 hours, respectively. In Table 1, "o" shows a case where occurrence of air bubbles or peeling is not observed; "x" shows a case where occurrence of air bubbles or peeling is observed; and "Δ" shows a case where occurrence of air bubbles or peeling is observed in some cases. After the samples are allowed to stand for 72 hours, air bubble having a diameter of about 2 cm and peeling occur on the entire surface of sample 1. After the samples are allowed to stand for 120 hours, air bubbles may occur along stepped portion 15 of sample 2. Note here that stepped portion 15 is described later. Furthermore, after the samples are allowed to stand for 120 hours, air bubbles having a diameter of about 0.6 mm occur along stepped portion 15 in sample 3. Note here that the diameter of the air bubble occurring in sample 3 is not largely increased even after 500 hours. In all the samples other than the above (in other words, sample 4 to 10), even after 500 hours have passed, occurrence of air bubbles or peeling is not observed.

As a result, as mentioned above, when the contact angle of cover lens 12 is 53° or less and the storage elastic modulus of first adhesive layer 14 is 68 kPa or more, occurrence of air bubbles or peeling can be suppressed even when the samples are allowed to stand under high temperature for a long time. Furthermore, as shown in sample 3, also when the contact angle of cover lens 12 is 59°, that is, more than 53° and the storage elastic modulus of first adhesive layer 14 is 68 kPa, improvement in terms of occurrence of air bubbles or peeling can be observed as compared with the case where the contact angle is 88° (sample 1). Furthermore, comparison between sample 1 and sample 2 shows that the occurrence of air bubbles can be suppressed more when the storage elastic modulus of first adhesive layer 14 at 90° C. is 80 kPa rather than 68 kPa.

Furthermore, sensor portion 13 may include first sensor layer 131, second sensor layer 132, and second adhesive layer 133. First sensor layer 131 includes first surface 301 bonded to cover lens 12 with first adhesive layer 14 and second surface 303 opposite to first surface 301. Second sensor layer 132 includes first surface 401 bonded to second surface 303 with second adhesive layer 133 and second surface 403 opposite to first surface 401. That is to say, second adhesive layer 133 bonds first sensor layer 131 and second sensor layer 132 to each other. Note here that a storage elastic modulus of second adhesive layer 133 is 80 kPa or more and 200 kPa or less. When the storage elastic modulus of second adhesive layer 133 is 80 kPa or more, a flow of second adhesive layer 133 is suppressed. Therefore, growth of air bubbles made of gas accumulated in second adhesive layer 133 can be suppressed. As second adhesive layer 133, for example, OCA mainly including an acrylic polymer is used.

Furthermore, since the storage elastic modulus of second adhesive layer 133 is 200 kPa or less, adhesion of second adhesive layer 133 to first sensor layer 131 or adhesion of second adhesive layer 133 to second sensor layer 132 can be prevented from being remarkably decreased. Therefore, under low temperature, adhesion between second adhesive layer 133 and first sensor layer 131 or second sensor layer 132 is improved. As a result, it is also possible to suppress occurrence of peeling of second adhesive layer 133 at an interface between first sensor layer 131 and second adhesive layer 133 or an interface between second sensor layer 132 and second adhesive layer 133.

First sensor layer 131 may include first electrode layer 1311. Second sensor layer 132 may include second electrode layer 1321. Note here that second electrode layer 1321 is disposed apart from first electrode layer 1311. In this state, a thickness of second adhesive layer 133 is preferably 40% or more and less than 65% with respect to a distance between first electrode layer 1311 and second electrode layer 1321. Note here that a thickness of second adhesive layer 133 is, for example, 100 micrometers. On the other hand, the distance between first electrode layer 1311 and second electrode layer 1321 is, for example, 225 micrometers. This configuration enables a difference in temperature between first electrode layer 1311 and second electrode layer 1321 to be reduced even if the temperature of touch panel 11 rapidly changes. Therefore, this configuration can reduce contribution of second adhesive layer 133 to the change of electrostatic capacity between first electrode layer 1311 and second electrode layer 1321 in response to a rapid temperature change. Consequently, even in a case of rapid temperature change, a change of sensitivity of touch panel 11 can be reduced. Thus, occurrence of misdetection by touch panel 11 can be suppressed.

In addition, a thickness of first adhesive layer 14 is preferably one or more times and two or less times as large as a thickness of second adhesive layer 133. This configuration can achieve both sufficient adhesion of the touch panel to the cover lens and high detection sensitivity of the touch panel.

It is preferable that an amount of change of the dielectric constant with respect to temperatures is smaller in first adhesive layer 14 than in second adhesive layer 133. This configuration can reduce contribution of second adhesive layer 133 to the change in the electrostatic capacity between first electrode layer 1311 and second electrode layer 1321 when the temperature of touch panel 11 changes rapidly. Therefore, even when the temperature of touch panel 11 changes rapidly, the change of the sensitivity of touch panel 11 can be reduced. Therefore, occurrence of misdetection by touch panel 11 can be suppressed.

Touch panel 11 may include stepped portion 15. Stepped portion 15 is a decoration portion provided to, for example, cover lens 12. The decoration portion is formed on the outer periphery of cover lens 12. Stepped portion 15 is formed between cover lens 12 and first adhesive layer 14. That is to say, first adhesive layer 14 is also filled between stepped portion 15 and sensor portion 13. In such a case, a thickness of first adhesive layer 14 is preferably three or more times and ten or less times as large as a thickness of stepped portion 15.

When a thickness of first adhesive layer 14 is less than three times as large as a height of stepped portion 15, first adhesive layer 14 does not easily follow the stepped shape. Accordingly, occurrence of air bubbles or peeling easily occurs in a stepped portion 15 part. When the thickness of first adhesive layer 14 is set to three or more times as large as the height of stepped portion 15, occurrence of air bubbles or peeling in stepped portion 15 can be suppressed. Furthermore, when the thickness of first adhesive layer 14 is more than ten times as large as the height of stepped portion 15, first adhesive layer 14 is easily peeled off from cover lens 12 due to a difference in the linear expansion coefficient between cover lens 12 and first adhesive layer 14. Furthermore, a distance from front-surface side 111 of cover lens 12 to first electrode layer 1311 or second electrode layer 1321 shown in FIG. 2 is increased. Therefore, a change at the time of operation of the electrostatic capacity is reduced, and the detection sensitivity of touch panel 11 deteriorates. When the thickness of first adhesive layer 14 is set to ten or less times as large as the height of stepped portion 15, the detection sensitivity of touch panel 11 is improved.

Second Exemplary Embodiment

Figure 3:
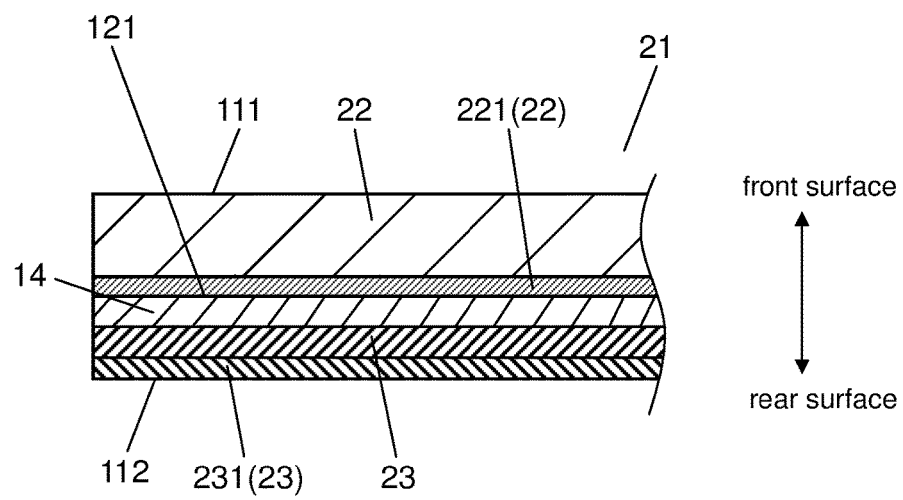
FIG. 3 is an enlarged sectional view of a principal part of a touch panel in accordance with a second exemplary embodiment.

Hereinafter, the other touch panel 21 is described with reference to drawings. FIG. 3 is an enlarged sectional view of a principal part of touch panel 21 in accordance with a second exemplary embodiment. Touch panel 21 includes cover lens 22 instead of cover lens 12 of touch panel 11 shown in FIG. 1. Furthermore, touch panel 21 includes sensor portion 23 instead of sensor portion 13 of touch panel 11 shown in FIG. 1. First electrode layer 221 is formed on cover lens 22. Second electrode layer 231 is formed on sensor portion 23. Cover lens 22 and sensor portion 23 are bonded to each other with first adhesive layer 14. That is to say, bonding surface 121 of cover lens 22 includes first electrode layer 221, and a water contact angle on first electrode layer 221 of bonding surface 121 is more than 0° and 59° or less. Furthermore, first adhesive layer 14 has a storage elastic modulus at 90° C. of 68 kPa or more and 200 kPa or less. Note here that electronic device 501 of FIG. 2 may use touch panel 21 instead of touch panel 11.

As mentioned above, the touch panel of the present disclosure includes a cover lens having a bonding surface and formed of a light-transmitting resin or glass, a sensor portion disposed facing the cover lens, and a first adhesive layer that bonds the sensor portion and the bonding surface to each other. The first adhesive layer has a storage elastic modulus at 90° C. of 68 kPa or more and 200 kPa or less. The water contact angle on the bonding surface is more than 0° and 59° or less.

Such a configuration increases the storage elastic modulus of the first adhesive layer, and therefore, a flow of the first adhesive layer can be suppressed. Therefore, this configuration suppresses the growth of air bubbles made of gas occurring from members such as the cover lens and accumulated in the first adhesive layer. In order to compensate for decrease of adhesion of the first adhesive layer to the cover lens due to the increase in the storage elastic modulus of the first adhesive layer, the contact angle is set to more than 0° and 59° or less. Since this configuration improves wettability of the first adhesive layer with respect to bonding surface 121, the first adhesive layer easily wets and spreads to bonding surface 121. Therefore, it is possible to suppress the occurrence of air bubbles occurring in bonding surface 121 around a contaminant as a core due to contamination of bonding surface 121 or the like. As a result, both the occurrence and the growth of air bubbles can be suppressed. Furthermore, since the storage elastic modulus of the first adhesive layer is 200 kPa or less, the adhesion of the first adhesive layer to the cover lens can be prevented from being remarkably decreased. Therefore, the adhesion of the first adhesive layer to the cover lens is improved, and occurrence of peeling at an interface between the cover lens and the first adhesive layer can be suppressed.

Furthermore, it is preferable that the storage elastic modulus at 90° C. of the first adhesive layer is 80 kPa or more.

Such a configuration can further suppress the flow of the first adhesive layer. Consequently, the configuration can further suppress the growth of air bubbles made of gas accumulated in the first adhesive layer.

Furthermore, the sensor portion may include a first sensor layer, a second sensor layer, and a second adhesive layer that bonds the first sensor layer to the second sensor layer. It is preferable that the second adhesive layer has a storage elastic modulus at 90° C. of 80 kPa or more and 200 kPa or less.

Such a configuration can suppress the flow of the first adhesive layer. Therefore, the growth of air bubbles of gas accumulated in the second adhesive layer can be suppressed. Furthermore, since the storage elastic modulus of the second adhesive layer is 200 kPa or less, adhesion of the second adhesive layer to the first sensor layer or adhesion of the second adhesive layer to the second sensor layer are prevented from being remarkably decreased. Consequently, the adhesion between the first sensor layer and the second sensor layer is improved, and occurrence of peeling can be suppressed at an interface between the first sensor layer and the second adhesive layer or at an interface between the second sensor layer and the second adhesive layer.

Furthermore, a thickness of the first adhesive layer is preferably one or more times and two or less times as large as a thickness of the second adhesive layer.

Such a configuration can achieve both sufficient adhesion of the sensor portion to the cover lens, and high detection sensitivity of the touch panel.

Furthermore, the touch panel includes a first electrode layer provided to the first sensor layer, and a second electrode layer provided to the second sensor layer and disposed apart from the first electrode layer. A thickness of the second adhesive layer is preferably 40% or more and less than 65% with respect to a distance between the first electrode layer and the second electrode layer.

Such a configuration restricts the ratio of the second adhesive layer in a volume between the first electrode layer and the second electrode layer. This aims at reducing the ratio of the second adhesive layer to the dielectric substance disposed between the first electrode layer and the second electrode layer, considering that a member in which a dielectric constant change in response to a temperature change is the largest is an adhesive layer among the members constituting the touch panel. This configuration can reduce contribution of the second adhesive layer to the change in the electrostatic capacity between the first electrode layer and the second electrode layer in response to the rapid temperature change. Therefore, even when the temperature changes rapidly, the change of the sensitivity of the touch sensor can be reduced. Therefore, occurrence of misdetection of the touch panel can be suppressed.

Furthermore, the amount of change of dielectric constant with respect to temperatures is smaller in the first adhesive layer than in the second adhesive layer.

Such a configuration can reduce the contribution of the second adhesive layer to the change in the electrostatic capacity between the first electrode layer and the second electrode layer in response to the rapid temperature change. Therefore, even when the temperature rapidly changes, the change of the sensitivity of the touch panel can be reduced. Therefore, occurrence of misdetection by the touch panel can be suppressed.

Furthermore, the touch panel may include a stepped portion between the cover lens and the first adhesive layer. It is preferable that a thickness of the first adhesive layer is less than three times and ten or less times as large as a thickness of the stepped portion.

Such a configuration can suppress the occurrence of air bubbles or peeling in a portion with step difference. When the thickness of the first adhesive layer is more than ten times as large as a height of the step difference, the first adhesive layer is easily peeled off from the cover lens due to a difference in the linear expansion coefficient between the cover lens and the first adhesive layer. However, the touch panel of the present disclosure can prevent peeling. Furthermore, the detection sensitivity of the touch panel is excellent.

As mentioned above, according to the touch panel of the present disclosure, since the storage elastic modulus of the first adhesive layer is increased, the flow of the first adhesive layer can be suppressed. Therefore, it is possible to suppress the growth of air bubbles made of gas occurring from members such as the cover lens and accumulated in the first adhesive layer. In order to compensate for decrease of adhesion of the first adhesive layer to the cover lens due to the increase in the storage elastic modulus of the first adhesive layer, the contact angle is set to more than 0° and 59° or less. Since this configuration improves wettability of the first adhesive layer to bonding surface 121, the first adhesive layer easily wets and spreads to bonding surface 121.

Therefore, it is possible to suppress the occurrence of air bubbles occurring in bonding surface 121 around a contaminant as a core due to contamination of bonding surface 121 or the like. As a result, both the occurrence and the growth of air bubbles can be suppressed.

Furthermore, since the storage elastic modulus of the first adhesive layer is 200 kPa or less, the adhesion of the first adhesive layer to the cover lens can be prevented from being remarkably decreased. Therefore, the adhesion of the first adhesive layer to the cover lens is improved, and occurrence of peeling at an interface between the cover lens and the first adhesive layer can be suppressed.

With the above-mentioned configuration, even when the touch panel is left or used at high temperature or low temperature, the occurrence of air bubbles can be suppressed on the first adhesive layer at the interface between the cover lens and the first adhesive layer. In addition, even when the touch panel is left or used at high temperature or low temperature, it is possible to suppress peeling of the first adhesive layer at the interface between the cover lens and the first adhesive layer. As a result, even under harsh temperature conditions, it is possible to obtain a touch panel having high reliability, being capable of suppressing deterioration of sensitivity and continuing clear displaying.

Note here that the present invention is not necessarily limited to the above-mentioned exemplary embodiments, and various modifications can be made, and it is needless to say that such modifications are encompassed in the scope of the present invention.

INDUSTRIAL APPLICABILITY

As mentioned above, a touch panel of the present disclosure has an advantageous effect that deterioration of sensitivity can be suppressed or clear displaying can be sustained even under harsh temperature conditions, and is useful in, for example, electronic devices installed in mobile devices, and the like.

REFERENCE MARKS IN THE DRAWINGS

11, 21 touch panel
12, 22 cover lens
13, 23 sensor portion
14 first adhesive layer
15 stepped portion
111 front-surface side
112 rear-surface side
121 bonding surface
131 first sensor layer
132 second sensor layer
133 second adhesive layer
221, 1311 first electrode layer
231, 1321 second electrode layer
301, 401 first surface
303, 403 second surface
501 electronic device
5011 enclosure
5012 display hole
5013 display unit
5014 controller

The invention claimed is:

1. A touch panel comprising:
a light-transmitting cover lens;
a sensor portion; and
a first adhesive layer that bonds the cover lens and the sensor portion,
wherein the first adhesive layer has a storage elastic modulus at 90° C. of 68 kPa or more and 200 kPa or less,
a surface of the cover lens, being in contact with the first adhesive layer, is a bonding surface, and a water contact angle on the bonding surface of the cover lens is more than 0° and 59° or less,
the sensor portion includes:
a first sensor layer having a first surface bonded to the cover lens with the first adhesive layer, and a second surface opposite to the first surface of the first sensor layer;

a second adhesive layer; and a second sensor layer having a first surface bonded to the second surface of the first sensor layer with the second adhesive layer, and a second surface opposite to the first surface of the second sensor layer, and the second adhesive layer has a storage elastic modulus at 90° C. of 80 kPa or more and 200 kPa or less.

2. The touch panel of claim 1, wherein the storage elastic modulus of the first adhesive layer at 90° C. is 80 kPa or more and 200 kPa or less.

3. The touch panel of claim 1, wherein the water contact angle on the bonding surface of the cover lens is more than 0° and 53° or less.

4. The touch panel of claim 1, wherein a thickness of the first adhesive layer is one or more times and two or less times as large as a thickness of the second adhesive layer.

5. The touch panel of claim 1, wherein
the first surface of the first sensor layer includes a first electrode layer,
the second surface of the second sensor layer includes a second electrode layer, and
a thickness of the second adhesive layer is 40% or more and less than 65% of a distance between the first electrode layer and the second electrode layer.

6. The touch panel of claim 1, wherein an amount of change of dielectric constant with respect to temperatures is smaller in the first adhesive layer than in the second adhesive layer.

7. A touch panel comprising:
a light-transmitting cover lens;
a sensor portion;
a first adhesive layer that bonds the cover lens and the sensor portion; and
a stepped portion between the cover lens and the first adhesive layer,
wherein the first adhesive layer has a storage elastic modulus at 90° C. of 68 kPa or more and 200 kPa or less,
a surface of the cover lens, being in contact with the first adhesive layer, is a bonding surface, and a water contact angle on the bonding surface of the cover lens is more than 0° and 59° or less, and
a thickness of the first adhesive layer is three or more times and ten or less times as large as a thickness of the stepped portion.

8. A touch panel of claim 1, comprising:
a light-transmitting cover lens;
a sensor portion; and
a first adhesive layer that bonds the cover lens and the sensor portion;
wherein the first adhesive layer has a storage elastic modulus at 90° C. of 68 kPa or more and 200 kPa or less,
a surface of the cover lens, being in contact with the first adhesive layer, is a bonding surface, and a water contact angle on the bonding surface of the cover lens is more than 0° and 59° or less, and
the bonding surface of the cover lens includes an electrode layer, and the sensor portion includes an electrode layer at an opposite side to a surface bonded to the bonding surface of the cover lens.

9. A touch panel of claim 1, comprising:
a light-transmitting cover lens;
a sensor portion; and
a first adhesive layer that bonds the cover lens and the sensor portion;
wherein the first adhesive layer has a storage elastic modulus at 90° C. of 68 kPa or more and 200 kPa or less,
a surface of the cover lens, being in contact with the first adhesive layer, is a bonding surface, and a water contact angle on the bonding surface of the cover lens is more than 0° and 59° or less, and
the cover lens is formed of resin.

10. A touch panel of claim 1, comprising:
a light-transmitting cover lens;
a sensor portion; and
a first adhesive layer that bonds the cover lens and the sensor portion;
wherein the first adhesive layer has a storage elastic modulus at 90° C. of 68 kPa or more and 200 kPa or less,
a surface of the cover lens, being in contact with the first adhesive layer, is a bonding surface, and a water contact angle on the bonding surface of the cover lens is more than 0° and 59° or less, and
the cover lens is formed of glass.

11. The touch panel of claim 7, wherein the storage elastic modulus of the first adhesive layer at 90° C. is 80 kPa or more and 200 kPa or less.

12. The touch panel of claim 7, wherein the water contact angle on the bonding surface of the cover lens is more than 0° and 53° or less.

13. The touch panel of claim 7, wherein the cover lens is formed of glass.

* * * * *